July 3, 1962 H. D. CRANE 3,042,923

MAGNETIC SWITCHING SYSTEMS FOR MAGNETIC RECORDING

Filed Sept. 22, 1958 2 Sheets-Sheet 1

INVENTOR.
HEWITT D. CRANE
BY Morris A. Pabkin
ATTORNEY

INVENTOR.
HEWITT D. CRANE
BY Morris Labkin
ATTORNEY

United States Patent Office 3,042,923
Patented July 3, 1962

3,042,923

MAGNETIC SWITCHING SYSTEMS FOR MAGNETIC RECORDING

Hewitt D. Crane, Palo Alto, Calif., assignor to Radio Corporation of America, a corporation of Delaware Filed Sept. 22, 1958, Ser. No. 762,592
15 Claims. (Cl. 346—74)

This invention relates to switching systems, and particularly to switching systems useful in data storage systems.

Data storage systems often use a large number of magnetic recording heads for storing information in a recording medium. For example, a magnetic tape or drum system may have a hundred or more separate recording heads. The large number of recording heads provides increased recording speed and decreased access time. A desired group of recording heads may be selected and then activated in writing separate information signals in the recording medium.

In the prior art switching systems, relay circuits and electronic circuits have been used to select the desired group of recording heads. Relay type networks operate relatively slowly; while electronic systems, although of high-speed, are relatively more expensive and complex.

It is an object of the present invention to provide improved switching circuits for writing information signals into a storage medium.

Another object of the present invention is to provide improved magnetic switching systems for selecting a desired group among a relatively large number of recording heads.

Still another object of the present invention is to provide an improved magnetic switching system which operates in a novel manner to select a plurality of recording heads for storing information.

According to the present invention, the recording heads are divided into $n$ groups each having $m$ recording heads. A separate writing circuit including a pair of writing windings and a pair of control cores is provided for each separate recording head. The two writing windings of any one recording head are used to write the two binary digits "1" and "0" in the medium at the location of that recording head. $m$ setting circuits are each linked to a different pair of control cores in each of the $n$ groups. All the control cores are linked by an interrogation circuit.

In operation, one of the $m$ groups of recording heads is selected by suitable selection circuitry. The $m$ setting circuits are selectively activated to set the control cores in each of the $n$ groups in accordance with the information desired to be written. An interrogation current is then applied to the interrogation circuit to reset all the control cores. At the same time, a writing current is applied to all the $n$ groups of writing circuits. The writing current is steered through one writing winding of each recording head of the selected group in accordance with the previous setting of the control cores.

A feature of the invention is that other groups of control cores may be used to select the desired one of the $n$ groups of recording heads.

Another feature of the invention is that the same current may be used for both the interrogation current and the writing current.

Figure 1:
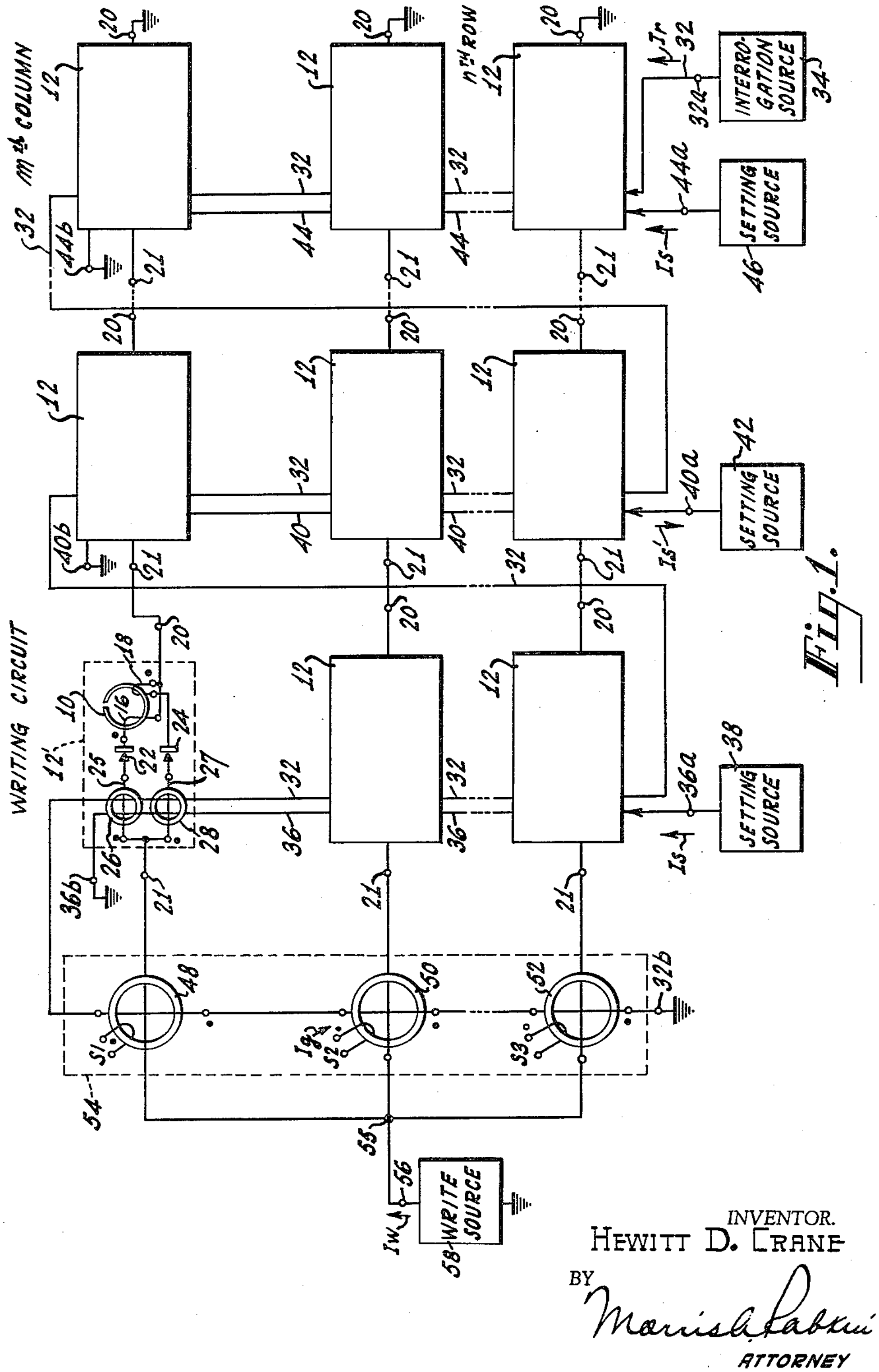
FIG. 1 is a schematic diagram of a switching circuit according to the invention using single apertured control cores.

The switching circuit of FIG. 1 includes a plurality of recording heads 10 arranged, for example, in a matrix having $n$ rows and $m$ columns. The dotted lines are used to indicate additional rows and columns of the matrix. Each recording head 10 is controlled by a separate writing circuit 12. Each of the writing circuits 12 is similar to the other; thus, only the writing circuit 12′ of the first row and column is described in detail. The recording head 10 may be any suitable transducer adapted for writing information signals into a recording medium. For example, a well-known ring-shaped recording head 14 may be used for writing information signals into a magnetic recording medium, not shown. A pair of writing windings 16 and 18 are linked in mutually opposite senses to the recording head 10, as indicated by the dot markings adjacent the winding terminals. The marking dots are the conventional polarity indicating dots used in the magnetic core art. Positive (conventional) current flow in one direction in a writing winding, i.e. into a dot terminal, produces a flux change in the recording head 10 in one sense, for example, the clockwise sense. All currents referred to hereinafter are assumed to flow in the conventional direction. Current flow in the other direction in a writing winding, i.e. out of a dotted terminal, then produces a flux change in the counterclockwise sense in a recording head 10. The pair of writing windings may be replaced by a single center-tapped winding, if desired, with the two halves of the single winding functioning as the two writing windings 16 and 18. The unmarked terminal of the writing winding 16 and the dot terminal of the writing winding 18 are each connected to an output terminal 20 of the writing circuit 12′. The other terminals of the writing windings 16 and 18 are each connected in a different series circuit to an input terminal 21 of the writing circuit 12′. Each series circuit includes a separate one of a pair of unilateral conducting devices, shown as diode rectifiers 22 and 24, and a separate drive winding 25, 27 of a pair of control cores 26 and 28 of substantially rectangular hysteresis loop material. The diodes 22 and 24 are poled for easy conduction in the direction of current flow from the input terminal. Preferably the diodes are of high current carrying capacity such as semiconductor diodes in order to minimize the number of turns required for the core windings. The drive windings 25, 27 are each linked in the same one sense to the control cores 26, 28 and each has its unmarked terminal connected to the anode of one of the diodes 22, 24. The marked terminals of the drive windings 25, 27 are both connected to the input terminal 21.

An interrogation coil 32 links both the control cores 26 and 28 of all the writing circuits 12 in the same one sense. One end terminal 32*a* of the interrogation coil 32 is connected to an output of an interrogation source 34. The interrogation coil also is connected to a selection switch described more fully hereinafter, and has its other end terminal 32*b* connected at a point of common reference potential, indicated in the drawing by the conventional ground symbol. The interrogation source 34 also has an output connected to ground.

All the control cores 26, 28 of the first column of writing circuits 12 are linked by a setting coil 36. The setting coil 36 links the control cores 26, 28 of any one writing circuit 12 in mutually opposite senses. For example, the control core 28 is linked in one sense and the control core 26 is linked in the opposite sense by the setting coil 36. One end terminal 36*a* of the setting coil 36 is connected to a setting source 38. The other end terminal 36*b* of the setting coil 36 is connected to ground. The second column of writing circuits 12 has a setting coil 40 linked in similar fashion to their control cores 26 and 28. The second setting coil 40 has one end terminal 40*a* connected to the output of a setting source 42, and has its other end terminal 40b connected to ground. The control cores 26, 28 of the mth column of write circuits 12 are linked by a setting coil 44 having one end terminal 44a connected to the output of a setting source 46, and the other end terminal 44b connected to ground. Each of the setting sources 38, 42 and 46 has a ground connection. The setting sources 38, 42 and 46 may be any suitable pulse source arranged to provide either a positive or a negative polarity setting signal to the connected setting coil.

The writing circuits 12 of any one row are connected in series with each other by connecting the output terminal 20 of one writing circuit 12 of a row to the input terminal 21 of the next writing circuit 12 of the same row. The output terminals 20 of the mth column of writing circuits 12 are all connected to ground. The input terminals 21 of all the writing circuits 12 of the first column are coupled via a different one of "n" group control cores 48, 50 and 52 of a selecting circuit 54 to a common junction 55. A separate group control core is used for controlling each different row of recording heads 10. The junction 55 is connected to an output terminal 56 of a write source 58. The group control cores 48, 50 and 52 preferably are of rectangular hysteresis loop material. The write source 58 also is provided with a ground connection.

The interrogation coil 32 is linked in the same one sense to all the group control cores 48, 50 and 52. The write source 58 and the interrogation source 34 each may be any suitable source arranged to supply unidirectional current pulses to the connected circuits.

Each of the group control cores 48, 50, 52 is linked by one or more different selecting windings, such as the selecting windings S1, S2 and S3, respectively. The selecting windings S1, S2 and S3 are used in conventoinal manner to set a desired one of the group control cores 48, 50 and 52 to one of its two remanent states P (positive) and N (negative), for example, the state P.

Each of the control cores 26, 28 also has two remanent states arbitrarily designated P and N. Relatively little flux change is produced when a core changes from remanence in one state to saturation in the same state, and a relatively large flux change is produced when a core changes from remanence in one state to saturation in the opposite state. Each of the windings and coils are shown in the drawing as single-turn; it is understood, however, that multi-turn windings and coils may be used where necessary or desirable.

In operation, all the control cores 26, 28 of the writing circuits 12 are initially in one remanent state, for example, in the N remanent state. Also, all the group control cores 48, 50 and 52 are initially in the N remanent state. Assume, now, that it is desired to operate the switching network to write a binary word of m digits into the recording medium. For example, assume the binary word is 10___1. In such case, a positive (setting) current Is is applied to each of the setting coils 36 and 44 by the setting sources 38 and 46, and a negative polarity setting current Is' is applied to the setting coil 40 by the setting source 42. Arrows adjacent to the various coils are used to indicate the direction of current flow in the setting coils. The positive setting currents Is in the setting coils 36 and 44 change the control cores 26 of all the writing circuits 12 of the first and mth columns from the initial remanent state N to the other remanent state P. The negative polarity setting current Is' flowing in the second setting coil 40 changes the control cores 28 of all the writing circuits 12 of the second column from the initial remanent state N to the other remanent state P. In similar manner each of the other m digits of the binary "word" is set into the other m columns, not shown, of writing circuits 12. Due to the back-to-back connection of the diodes 22 and 24 of each writing circuit 12, no current flow is produced in the control windings 25, 27 during a setting operation as a result of the flux changes in the control cores 26, 28.

Assume further that it is desired to write the binary word 10___1 into the medium at the location of the second row of recording heads 10. In such case, a positive selecting current Ig is applied to the selecting winding S2 to change the group control core 50 from the initial remanent state N to the other remanent state P. Again, no currents flow in the writing circuits 12 during the setting of the group control core 50 because of: (1) the back-to-back connection of the diodes 22, 24 of the second row of writing circuits 12 with respect to the diodes 22, 24 of the first and nth rows of the writing circuits 12; and (2) the write source 58 and the interrogation source 34 are each effectively open-circuited during the selection of a group control core. Thus, no current can flow through the write source 58 or through the interrogation coil 32 during a selection operation. The setting sources 38, 42 and 46 and the setting of selection switch 54 can be operated sequentially or simultaneously, as desired.

At any later time, the interrogation source 34 is operated to apply a positive interrogation current Ir to the interrogation coil 32. The interrogation current Ir changes all the previously set control cores 26, 28 from the set state P to the initial state N, and changes the master control core 50 from the set state P to the initial state N. During the presence of the interrogation current Ir, the write source 58 is operated to apply a positive polarity write current Iw to the common junction 55. The write current Iw is steered by the group control core 50 to the second row of writing circuits 12. The steering of the write current Iw occurs because the flux change in the group control core 50 due to the interrogation current Ir is in a direction to make the common junction 55 negative relative to the input terminals 21 of all the rows of writing circuits 12, except the selected second row. Thus, the diodes 22, 24 of the first and nth rows of writing circuits 12 of the drawing, are biased to non-conduction. Substantially all the write current Iw then flows in the second row of writing circuits 12 during the switching of the group control 50.

The flux change caused by the interrogation current Ir in the control cores 26 of the first and mth columns of writing circuits 12 induces a voltage in the control winding 25 in a direction to make the unmarked terminal positive relative to the marked terminal. Thus, the lower diodes 24 of these circuits are biased to non-conduction. The write current Iw then is further steered through the upper series path including the diode 22 and the writing winding 16 of the recording head 1p of the writing circuits previously storing binary "1" digits. In the second column writing circuit 12, storing a binary "0" digit, the upper diode 22 is biased to non-conduction due to the flux change in the control core 28. The write current Iw then is steered in the second column, second row writing circuit 12 through the lower series path including the diode 24 and the writing winding 18. Accordingly, binary "1" digits are written into the storage medium by the recording heads 10 of the second row and first and mth columns due to the current flow in the writing windings 16; and the binary digit "0" is written into the storage medium by the recording head 10 of the second row and second column due to the current flow in the writing winding 18.

The write current Iw preferably is terminated just prior to the time when the control cores 26 and 28 reach their saturated conditions in the initial N state. However, if the write current is continued after the control cores are saturated, no adverse results occur because the write current Iw divides equally between the writing windings 16 and 18 of a recording head applying no or very little net magnetizing force to the recording head 10. The interrogation current Ir preferably is terminated when the group control core 50 is changed to saturation in the initial state N. Also, in practice, the group control cores are made larger in volume than any of the writing circuit control cores. The larger volume insures that the steering of the writing current is fully controlled even though the control cores of the non-selected rows of writing circuits produce voltages tending to oppose that produced by the selected group control core.

Any other row of writing circuits 12 may be selected in similar fashion for writing any other binary word into the storage medium.

An article by J. A. Rajchman and H. D. Crane, published in the IRE Transactions on Electronic Computers, March 1957, describes in more detail further design information on circuits using current steering in their operation.

Figures 2, 3:
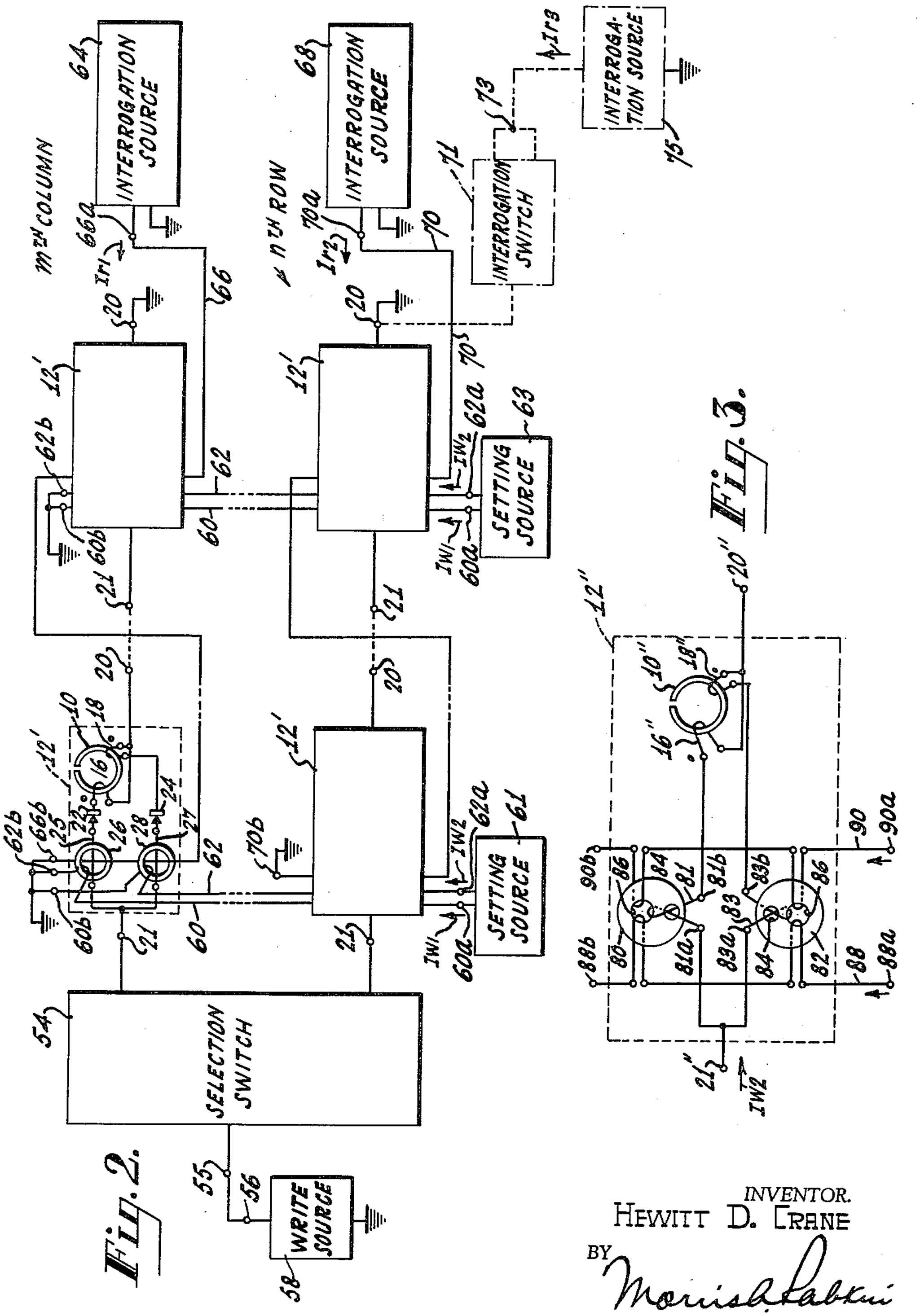
FIG. 2 is a schematic diagram of another embodiment of a switching circuit according to the invention using a different arrangement of setting cores.
FIG. 3 is a schematic diagram of an embodiment of a transfluxor writing circuit and useful in switching systems according to the invention.

The system may be modified for use with setting currents of one polarity by using a separate pair of setting coils for each different column of writing circuits 12′, as shown in FIG. 2 for the pairs 60, 62 of setting coils.

For convenience of drawing, only the first and last of the $n$ rows and $m$ columns of the matrix of writing circuits 12′ is shown. The system of FIG. 2 is similar to that of FIG. 1 except in the manner of linking the setting coils and in the use of a plurality of interrogation coils. The advantage derived from the plurality of interrogation coils is described more fully hereinafter. One setting coil of a pair of 60 links all the upper control cores 26 in a column, and the other setting coil 62 of the same pair links all the lower control cores 28 of the same column. The setting sources 61 and 63 of FIG. 2 are then arranged to apply selectively a current pulse of one polarity, say positive, to either one or the other of the pair of setting coils 60 and 62 in writing the one or the other of the binary digits "1" and "0."

In certain storage applications, large "blocks" of information characters are written into the storage medium by a single group of recording heads before other information is written into the storage medium by another group of recording heads. In such systems, independent interrogation coils can be used to advantage. For example, in FIG. 2, an interrogation coil 66 links all the control cores 26, 28 of the upper row of writing circuits 12′, and another interrogation coil 70 links all the control cores of the lower row of writing circuits 12′. Separate interrogation sources 64 and 68 are respectively coupled to the interrogation coils 66 and 70. During operation, an information character of a block of information characters is first set into one of the groups of writing circuits 12′, for example, the upper row. Next, the interrogation source 64 and the write source 58 are activated to reset the previously set control cores 26, 28 of the upper row and to activate the coupled reading heads 10. Previously set ones of the control cores 26, 28 of the lower row of writing circuits 12′ remain set after the interrogation operation. Once any one of the control cores 26, 28 of the unselected row of writing circuits 12′ is set, it remains set during the writing of the block of information into the storage medium by the selected row of writing circuits 12′. In most encoded blocks of information characters, successive characters differ in at least one binary digit. Thus a 10 character may be succeeded by a 11 character. In any event, after the setting sources 61 and 63 have been activated to write a binary "1" and a binary "0" in the same column (or digit position) all the control cores 26, 28 of the non-selected rows of writing circuits are in their set condition and thereafter remain in the set condition. The setting currents from the setting sources 61 and 63 then need switch only the control cores 26, 28 of the selected row of writing circuits 12′. Such operation provides advantages in reducing the average power required for operating the setting sources 61 and 63.

The embodiments of FIGS. 1 and 2 also differ in their operation in selecting different groups of writing circuits 12. Recall that in the embodiment of FIG. 1, the single interrogation current $I_r$ automatically resets all the control cores 26 and 28 including those of the non-selected rows. Also recall that each new setting current $I_s$ sets one control core 26 or 28 in all the writing circuits 12 of a column for each succeeding information character written into the storage medium. In the embodiment of FIG. 2, when it is desired to select another row of writing circuits 12′ the control cores 26, 28 of that row must first be reset. The resetting operation can be done in various ways. For example, assume selection of the second row. Prior to setting the selection switch 54, the interrogation source 68 can be operated to apply an interrogation current $I_{r2}$ to the interrogation coil 70. In the absence of a write pulse from the write source 58, the interrogation current $I_{r2}$ flowing in the interrogation coil 70 resets the control cores 26, 28 of the second row of writing circuits 12′ to receive new information. The setting sources 61 and 63 and the selection switch 54 can then be activated to store the information desired to be recorded. Another way of resetting the control cores is by means of a reset coil (not shown) linked to all the conrol cores 26, 28 of the writing circuits 12, 12′ in the manner described for the interrogation coil 32 of FIG. 1. In such case, prior to selecting a new row of writing circuits 12′, a reset current is applied to the reset coil (not shown) to return all the control cores 26, 28 to the initial reset condition.

The selective interrogation system of FIG. 2 may be modified for use with a single interrogation source by providing an interrogation selection switch 69 (shown dotted) similar to the selection switch 54 of FIG. 1. The interrogation coils 66 and 70 are disconnected from the interrogation sources 64 and 68 and are coupled through the group control cores of the interrogation switch 71 to a common junction 73. The common junction 73 is connected to the output of the single interrogation source 75. The interrogation current $I_{r3}$ applied to the common junction 73 is then steered by the selected group control core of the interrogation switch 71 to the desired row of writing circuits 12′.

The writing circuits 12 of the invention may be modified to eliminate the pair of diodes and the pair of control cores by using a pair of transfluxors, as shown for the writing circuit 12″ of FIG. 3. The individual transfluxors 80, 82 of FIG. 3 are each similar in construction and operation to the two-apertured transfluxors described in FIG. 3 of an article by J. A. Rajchman and A. W. Lo, entitled "The Transfluxor," and published in the March 1956 Proceedings of the IRE. Each of the transfluxors 80 and 82 has a separate drive winding 81 and 83 linked in figure-eight fashion through both its smaller drive aperture 84 and its larger setting aperture 86. The end terminals 81a and 83a of the drive windings 81 and 83 are connected to the input terminal 21″ of the writing circuit 12″. The other end terminals 81b and 83b of the drive windings 81 and 83 are connected, respectively, to the writing windings 16″ and 18″ of the recording head 10″. The unmarked terminal of the writing winding 16″ and the marked terminal of the writing winding 18″ are each connected to the output terminal 20″ of the writing circuit 12″. A setting coil 88 is linked through the setting apertures 86 of both transfluxors 80, 82 in mutually opposite senses.

A positive setting current flowing into the terminal 88a of the setting coil 88 changes the upper transfluxor 80 from its blocked to its set condition, and a negative setting current flowing into the terminal 88a of the setting coil 88 changes the lower transfluxor 82 from its blocked to its set condition. A blocking coil 90 is linked through both the setting apertures 86 of the transfluxors 80 and 82 such that a positive current flowing into the terminal 90a of the blocking coil 90 changes both the transfluxors 80 and 82 to their blocked condition.

When one of the transfluxors 80, 82 is in its set condition, it offers a relatively high impedance to a write current $I_{w2}$ flowing into the input terminal 21'' of the writing circuit 12''. The blocked transfluxor of the pair offers relatively small impedance to the write current $I_{w2}$. The write current $I_{w2}$ then divides and flows through the writing windings 16'' and 18'' of the recording head 10' in accordance with the impedance ratio offered by the transfluxors 80 and 82. Thus, when the transfluxor 80 is in its set condition and the transfluxor 82 is in its blocked condition, substantially all the write current $I_{w2}$ flows in the writing winding 18''. When the transfluxor 82 is in its set condition and the transfluxor 80 is in its blocked condition, substantially all the write current $I_{w2}$ flows in the other writing winding 16''.

Details of the operation of transfluxor switching circuits are described in a copending application entitled "Magnetic Systems," Serial No. 582,986, filed May 7, 1956, by the present applicant. The copending application also describes various other modes of operating transfluxor switching systems, in addition to the mode described above. Any of these other modes of operating the transfluxor write circuit 12'' may be used in the present invention.

There have been described herein improved switching systems for use in recording systems. In the present invention, the control cores used in the writing circuits provide both the functions of storage and switching. These double functions are particularly advantageous when the device providing the incoming information operates at a different rate from that of storing information in the recording medium. The incoming information remains stored in the selected group of writing circuits for as long as desired. Also, the single writing current insures that all the channels of the storage medium are written into simultaneously and with the same net excitation. This uniformity of writing facilitates the later reading of the stored information from the storage medium.

The switching systems of the invention described herein may include systems using single-apertured cores and diode rectifiers, and systems using only transfluxor cores.

What is claimed is:

1. A switching network comprising a plurality of transducers, a plurality of writing circuits, said writing circuits each comprising a pair of current paths linked in opposite senses to a different one of said transducers, a separate magnetic control device connected in each said path, said control devices each having two remanent states, said writing circuits being connected in series with each other for receiving a single writing signal, a plurality of setting means each linking the control devices of a different writing circuit, an interrogation circuit linking each of said control devices, means for applying separate setting signals to said setting circuits for establishing said control devices in desired ones of said remanent states, means for applying an interrogation signal to said interrogation circuit, said single writing signal being applied to said writing circuits concurrently with said interrogation signal, said writing signal being steered through one or the other of said paths of each said writing circuit in accordance with the remanent states of said control devices.

2. A switching network as claimed in claim 1 wherein said separate magnetic control devices are single-apertured magnetic cores and said current paths each include a separate unidirectional conducting device connected in series between said transducer and said control device.

3. A switching network as claimed in claim 1 wherein each said magnetic control device is a transfluxor having first and second apertures, said setting means being linked through said first apertures of said transfluxors of a writing circuit, said current paths being linked through both said first and second apertures of said transfluxors, and said interrogation circuit being linked through said first apertures of said transfluxors.

4. A switching network comprising a plurality of transducers and a plurality of writing circuits, said writing circuits each comprising a pair of current paths linked in opposite senses to a different one of said transducers, a separate magnetic control device connected in each said path, said control devices each having two remanent states, different ones of said writing circuits being connected in series with each other in groups and said groups being connected in parallel with each other, a plurality of setting means each linking the control devices of another different writing circuit in each of said groups, interrogation means linking the control devices of said groups of said writing circuits, means for applying separate setting signals to said setting means, means for applying an interrogation signal to said interrogation means, means for selecting a desired one of said groups of writing circuits, and means for applying to all said groups of writing circuits a writing signal concurrently with said interrogation signal, said writing signal being steered through one or the other of said paths of said writing circuits of said selected group under the control of said interrogation signal.

5. A switching network as claimed in claim 4, said means for selecting a desired one of said groups of writing circuits comprising a separate magnetic core for each of said groups, each said separate core having two remanent states, a common junction, each said group of writing circuits being coupled through a different one of said separate magnetic cores to said common junction, means for setting the one of said separate magnetic cores corresponding to said desired one group of writing circuits to one of said remanent states and the remaining ones of said separate cores to the other of said remanent states, said interrogation means being further linked to each of said separate cores, and said writing signal being applied to said common junction.

6. A switching network as claimed in claim 4, said interrogation means including a separate interrogation circuit linking the control devices of each different group of said writing circuits.

7. A switching network as claimed in claim 4, said interrogation means including a single interrogation circuit linking all said control devices.

8. A switching network as claimed in claim 4 including a plurality of interrogation circuits each linking the control devices of a different one of said groups of writing circuits, means for selecting a desired one of said groups of writing circuits, and means for applying said interrogation signal to said selected one group of writing circuits.

9. A switching network as claimed in claim 4, said setting means each including a different setting coil linked in respectively opposite senses to the control devices of each said pair of current paths.

10. A switching network as claimed in claim 4 wherein said setting means each include a pair of setting coils, the one and the other setting coils of any one pair being linked to the control devices of the one and the other current paths of the said other different writing circuits.

11. A switching network comprising a plurality of recording heads, a separate writing circuit linked to each different recording head, said recording heads and writing circuits being arranged to correspond with the elements of a matrix arranged in $n$ rows and $m$ columns, said writing circuits each comprising a pair of current paths linked in respectively opposite senses to its coupled recording head, a separate magnetic control device coupled in each said path, said control devices each having two remanent states, $m$ setting circuits, any one setting circuit linking the control devices of any one column of writing circuits for setting the control devices of that one column to desired remanent states, an interrogation means linking all said control devices, means for applying a writing signal to a desired one of said $n$ rows of writing circuits and for concurrently applying an interrogation signal to said interrogation means, said writing signal being steered through one or the other of said paths in each writing circuit of said desired row in accordance with the previously set remanent conditions of said control devices.

12. A switching network as claimed in claim 11, said control devices each including a transfluxor having first and second apertures, said current path of any one control device being linked through both said first and second apertures, said setting circuit of any one column being linked through said first apertures of all the transfluxors of that column, and said interrogation means being linked through said first apertures of all said transfluxors.

13. A switching network as claimed in claim 11, said interrogation means including $n$ separate interrogation circuits each linking the control device of a different row of said writing circuits.

14. A switching network as claimed in claim 13 including an interrogation switch having $n$ control cores, a common junction, each said interrogation circuit being coupled to a different one of said $n$ control cores to said common junction, and said interrogation signal being applied to said common junction.

15. A switching network as claimed in claim 11, said setting circuits each including a pair of setting coils, one setting coil of any one pair linking one control device of each said writing circuit of any one column, the other setting coil of that pair linking the other control device of each writing circuit of that one column and said interrogation means including $n$ interrogation circuits each linking all the control devices of a different one of said $n$ rows of writing circuits.

References Cited in the file of this patent

UNITED STATES PATENTS

| | | |
|---|---|---|
| 2,719,773 | Karnaugh | Oct. 4, 1955 |
| 2,719,964 | McGuigan | Oct. 4, 1955 |
| 2,803,812 | Rajchman et al. | Aug. 20, 1957 |
| 2,856,596 | Miller | Oct. 14, 1958 |
| 2,879,500 | Vaughan | Mar. 24, 1959 |
| 2,884,620 | Sepahban | Apr. 28, 1959 |